US006722222B1

(12) United States Patent
Dolan et al.

(10) Patent No.: US 6,722,222 B1
(45) Date of Patent: Apr. 20, 2004

(54) INCLINED RACK AND SPIRAL RADIUS PINION CORKSCREW MACHINE

(75) Inventors: Michael J. Dolan, San Francisco, CA (US); Dominic P. Symons, Pasadena, CA (US); Sung Kim, Palo Alto, CA (US); Diego G. Andina, Gussago (IT); Gianpiero Tonetti, Lodi (IT)

(73) Assignee: Williams-Sonoma, Inc., San Francisco, CA (US)

( * ) Notice: Subject to any disclaimer, the term of this patent is extended or adjusted under 35 U.S.C. 154(b) by 128 days.

(21) Appl. No.: 10/047,624

(22) Filed: Jan. 14, 2002

Related U.S. Application Data

(62) Division of application No. 09/634,130, filed on Aug. 8, 2000, now Pat. No. 6,357,322.

(51) Int. Cl.[7] .............................................. F16H 01/04

(52) U.S. Cl. .............................. 74/422; 74/29; 74/120; 74/435

(58) Field of Search .............................. 74/29, 30, 32, 74/33, 120, 121, 422, 435, 437; 81/3.45

(56) References Cited

U.S. PATENT DOCUMENTS

| | | | | |
|---|---|---|---|---|
| 304,118 A | | 8/1884 | Moomy | |
| 384,839 A | | 6/1888 | Gilchrist | |
| 392,116 A | | 10/1888 | Gilchrist | |
| 478,545 A | | 7/1892 | Gilchrist | |
| 619,648 A | | 2/1899 | Williams | |
| 802,265 A | | 10/1905 | Brown | |
| 814,641 A | | 3/1906 | Coomber | |
| 2,973,658 A | * | 3/1961 | Bishop | 91/382 |
| 3,064,491 A | * | 11/1962 | Bishop | 74/437 |
| 4,036,073 A | * | 7/1977 | Kitano | 74/393 |
| 4,253,351 A | | 3/1981 | Allen | 81/3.38 |
| 4,399,720 A | * | 8/1983 | Cuppett | 81/3.37 |
| 4,444,070 A | * | 4/1984 | Yanai | 74/422 |
| 4,703,673 A | | 11/1987 | Allen | 81/3.29 |
| 4,765,206 A | | 8/1988 | Poehlmann | 81/3.37 |
| 5,924,338 A | | 7/1999 | Peck | 81/3.37 |
| 5,934,160 A | | 8/1999 | Gibson | 81/3.37 |
| D415,667 S | | 10/1999 | de Bergen | D8/42 |

OTHER PUBLICATIONS

Peter, Ferd, *Mechanical Corkscrews. Their Evolution, Actions, and Patents*. Holland: Peters, 1999.
Bull, Donald, *The Ultimate Corkscrew Book* (*Schiffer Book for Collectors*), 1999 Schiffer Publishing Ltd.
D'Errico, Nicholas, *American Corkscrew Patents*, Conn. 1993.
Wallis, Fletcher, *British Corkscrew Patents from 1795*, Vernier Press England, 1998.
Watney & Babbidge, *Corkscrews for Collectors*, Sotheby Parke Bennet, 1981.
O'Leary, Fred, *1000 Patented Ways to Open a Bottle*, 1997 Schiffer Publishing Ltd.
http://www.corkscrew–balloon com/cork/94best.html, 2 pages, Jul. 21, 2000.
*http://www.angelfire.com/electronic/fpeters/best six 2000 htm*, 3 pages, Jul. 21, 2000.

* cited by examiner

*Primary Examiner*—David A. Bucci
*Assistant Examiner*—Colby Hansen
(74) *Attorney, Agent, or Firm*—Allston L. Jones

(57) ABSTRACT

Corkscrew machine including rotatable spiral radius pinion gear mechanically coupled to annular collar and engages inclined gear rack to translate driver up and down carrying freely rotating, helical corkscrew. Crank rotates spiral radius pinion gear to translate driver up and down relative to collar along rotation axis of corkscrew with mechanical advantage increasing as driver approaches collar. A non-rotating collar cam coupled to, translated relative to, driver, receives and follows helix of corkscrew to impart torque rotating the corkscrew when held stationary within annular collar responsive to translation of driver toward and away from annular collar. Biased, releasable collar latch captures and holds collar cam at stationary position within annular collar releasing it to translate upward with driver upon an upward cork pulling stroke of driver relative to collar when bottle is held within annular collar.

16 Claims, 14 Drawing Sheets

INCLINED RACK AND SPIRAL RADIUS PINION CORKSCREW MACHINE

This is a divisional of copending application Ser. No. 09/634,130, filed on Aug. 8, 2000, now U.S. Pat. No. 6,357,322.

FIELD OF THE INVENTION

The invention relates to single lever, two cycle, rack and pinion corkscrew machines and translating driver machines having an inclined gear rack with a spiral radius pinion gear.

BACKGROUND OF THE INVENTION

The lore of corkscrews is well chronicled in literature published by patent offices and collectors both in print and over the internet the world around. (See for example, Peters, Ferd. *Mechanical Corkscrews, Their Evolution, Actions, and Patents*. Holland: Peters, 1999; Bull, Donald, *The Ultimate Corkscrew Book* (Schiffer Book for Collectors.) 1999 Schiffer Publishing, Ltd.; ISBN: 0764307010; D'Errico, Nicholas *American Corkscrew Patents,* Conn.1993; Wallis, Fletcher, *British Corkscrew Patents* from 1795, Vernier Press England, 1998; Watney & Babbidge, *Corkscrews for Collectors,* Sotheby Parke Bennet, 1981 ISBN 0 85667 113 4 and O'Leary, Fred 1000 *Patented Ways to Open a Bottle* Schiffer Publishing, Ltd. 1997; ISBN: 0764300180 and on the internet at: <bullworks.net/virtual.htm>, <corkscrewnet.com>, & <angelfire.com/electronic/fpeters/>)

The problem of screwing a helical worm into a cork stoppering a bottle neck, then pulling the skewered cork from the bottle neck and finally stripping the pulled, skewered cork from the helical worm has and still titillates inventive genius, entrepreneurial interest, and collector mania. The perfect corkscrew has not yet been invented.

Thomas Lund's famous bottle grip cork screw patented in 1838 (Great Britain Pat No 7,761) includes a longitudinal cylindrical (French) cage or frame with flanges extending from the bottom end of the cage adapted to locate the mouth of a bottle neck coaxially with the cage. A coaxial shaft, turned by a T-handle, has a cylindrical gear rack shank with a helical worm tip that translates within the cage. A pinion/worm gear secured at the top end of the cage or frame, turned by another T-handle, engages the gear rack shank for pulling the cork from the bottle neck into the cage/frame after it is screwed into the cork One hundred sixty one years later in 1999, Jeremy H. Gibson obtained U.S. Pat. No. 5,934,160 for a Cork Extractor that differs little from that of patented and manufactured by Thomas Lund. Gibson uses a pivoting lever with a semicircular gear instead of a pinion/worm gear (See Peters, F. *Mechanical Corkscrews, Their Evolution, Actions, and Patents* (supra at p. 189) to translate the rack shank of the helical worm screwed into the cork. Gibson also elected to use a non-rotating collar cam for imparting torque to the helical worm upon translation of the shaft up and down in the frame using the lever instead of a manually turned T-handle to screw the worm into the cork. A non-rotating collar cam for imparting torque to rotate the helical worm of a corkscrew is a characterizing feature of most bench mounted, barroom cork extractor machines manufactured at the beginning of the 20th century. In fact a collar cam was utilized by Heinrich Fuckel, 1913, in a registered German Design DRGM No. 569,802, for a very similar single lever portable corkscrew machine manufactured in those years by Recknagel of Steinbach-Hallenberg in Schmalkalden. (Also note French Patent No. 448,795, issued Sep. 27, 1912, and comparable corkscrew machines shown in Peters, F. *Mechanical Corkscrews, Their Evolution, Actions, and Patents,* supra)

The highly coveted Royal Club Corkscrew patented and manufactured in Great Britain in 1864 by Charles Hull features an open steel frame with an annular hub guiding a shaft tipped with a helical worm rotated by a T-handle having a single, S-curved lever coupled to a collar encircling the shaft between the frame and an annular shoulder beneath the T-handle. The S-curved lever rests, slides and pivots against a fulcrum shoulder at the top of the frame to raise the shaft relative to the frame for pulling a cork skewered by the helical worm from a bottle. In some embodiments, a roller bearing is located at the fulcrum shoulder to provide rolling contact between the moving S-curved lever arm and the stationary frame. A graspable, arcuate, rim tang extends coaxially downward from the annular hub at the base of the frame on the diametrically opposite side of the frame, relative to the fulcrum shoulder at the top of the frame. The location of the rim tang first facilitates manual alignment of the annular hub with the bottle mouth and second provides leverage with the bottle for counter balancing the forces of the pivoting sliding S-curved lever as a cork is pulled from a bottle.

To use a Royal Club Corkscrew, one grasps the downward extending rim tang and bottleneck in one hand aligning the mouth of the bottle with the annular hub of the frame, and then with the other hand, first screws the helical worm into the cork using the T-handle, and then pulls the skewered cork by rotating the S-curved lever downward sliding it relative to the fulcrum shoulder. The mechanical advantage provided by the S-curved lever is at a maximum when the helical worm is fully screwed into the cork and decreases as it slides upward pivoting on the fulcrum shoulder lifting the shaft relative to the frame pulling the cork from the bottle.

One hundred seventeen years later, in 1989, Herbert Allen obtained his U.S. Pat. No. 4,253,351 for a highly regarded Cork Extractor functionally quite similar to early 20th century, bench mounted, barroom corkscrew machines. In his patent, Allen describes a system of linked parallel pivoting levers for converting rotational movement of an actuating lever arm to linearly translate a carrier up and down guided by a rod stem extending into through a base frame. The base frame is adapted to be clamped onto a bottle neck. Manufactured and distributed by the Hallen Company of Texas under the mark Screwpull®, the system of linked, parallel pivoting levers converting rotational movement of the actuating lever arm of described by Allen morphed into a traditional linear gear rack parallel to the rotation axis of the corkscrew translating with the carrier driven by an exterior semicircular pinion gear integrated into an end of a lever crank coupled to, and pivoting on the base frame. (See also U.S. Pat. No. Des.415,667, Stephanne de Bergen entitled Lever-type Cork Extractor) The gear rack and rod stem of the Allen machine function as parallel guide rails respectively received in a rack channel and a rod guide passageways traversing through the body of the base frame to align the axis of a freely rotating helical corkscrew with that of a bottle mouth clamped and captured within the base frame between a pair of perpendicularly extending, clamshell-like engagement arms pivotally fastened to the base frame. Similar to Heinrich Fuckel, Herbert Allen utilizes a non-rotating collar cam receiving, and following the helix of the corkscrew to impart torque for rotating the corkscrew as it translates with the carrier.

The unique feature of the Screwpull® corkscrew machine is a normally biased latching mechanism for capturing and holding the non-rotating collar cam translatable on the guide stem just above where the clamshell engagement arms clamp onto the top of a bottle. The clamped neck and top of a bottle function as a fulcrum for spreading apart the pivoting couplings securing the clamshell engagement arms to the base frame of the machine. Spreading the pair of pivoting couplings retracts dogs latching the collar cam to the base frame, freeing the collar allowing it to translate with the carrier. In a first cycle, the lever crank is pivoted forward ~270° translating the carrier downward screwing the worm into the cork and then pivoted backward ~270° pulling the skewered cork from the bottle. As the dogs latching the collar cam to the base only retract when a bottle is clamped between the clamshell engagement arms, once the cork has been pulled from the bottle, and the bottle separated from the machine, in a second cycle, the skewered cork and collar cam is translated back down to the base frame in a second forward ~270° pivot of the crank, allowing the dogs latch onto the collar cam whereupon the lever crank is again pivoted backward ~270° translating the carrier upward. The captured non-rotating collar cam screws the worm out of the cork on the second backward pivot of the lever crank, i.e. strips the cork from the machine. The Allen device requires complex manipulation of the users hands to first grasp the bottle neck with two separately pivotable handles, to grip the two handles with one hand while using the other hand to rotate the operational lever through a rotation that is substantially greater than 180°.

SUMMARY OF THE INVENTION

A single lever, two cycle, manual, corkscrew machine according to the invention is described that includes a translating driver carrying a freely rotating, helical corkscrew, a guide stem parallel the rotation axis of the corkscrew and a gear rack inclined with respect to the rotational axis of the corkscrew. A graspable annular collar with a passageway receives the translating driver guide stem aligning the rotation axis of the corkscrew coaxially with the collar axis. A rotatable pinion gear having a spiral radius is mechanically coupled to the annular collar and engages the inclined gear rack of the driver. A crank bail rotates the spiral radius pinion gear for translating the driver up and down relative to the collar along the rotation axis of the corkscrew with a mechanical advantage that increases as the driver approaches the collar. A non-rotating collar cam coupled to and translatable on the guide stem, receives and follows the helix of the corkscrew for imparting torque rotating the corkscrew when held at a rest position within the annular collar responsive to translation of the driver toward and away from the annular collar. A biased, releasable collar latch captures and holds the collar cam in the rest position within the annular collar releasing it to translate upward with the driver upon an upward 'cork pulling' translation stroke of the driver relative to the collar only when a bottle neck is grasped and held within the annular collar.

An advantage of the single lever, two cycle, manual corkscrew machine according to the invention relates to uniformity of resistance experienced by a user operating the machine in the first cycle, rotating the lever crank forward turning the spiral radius pinion gear translating the driver downward for screwing the helical worm into the cork, then rotating crank backward pulling the cork from the bottle and finally, in a second cycle. rotating the crank forward and back again to strip the cork from the corkscrew.

Other unique features of the a single lever, two cycle corkscrew machine according to the invention relate to optimization of such factors as gear engagement between the spiral radius pinion gear and the inclined gear rack, crank rotation and vertical translation of the driver, and conforming minimum and maximum resistance forces actually encountered to those intuitively expected by a user, manually operating the machine to pull a cork from a favored bottle of wine.

In fact, with the single lever, two cycle, manual corkscrew machine, it is possible to pull a cork with an approximately 180° rotation of the crank.

Further advantages of the single lever, two cycle, manual corkscrew machine according to the invention relate to an opposed pair of graspable, arcuate rim tangs extending downward from the annular collar of the machine adapted to be gripped within a user's hand for clasping and capturing the neck of a bottle. The tangs included inward stepped lands to capture and support different diameter bottle mouth rims stationary with respect to the collar. Like the Screwpull® by Allen, clasping a bottle neck between the rim tangs releases a biased, releasable collar latch, but in contrast to the Allen machine, a device according to the present invention intuitively forces a user to dynamically counter balance resistance forces encountered as the user first rotates the crank one way with the other hand to drive the corkscrew into the cork and then rotates the crank backward the other way for pulling the cork from the bottle. In particular, the mechanical advantage afforded by the downward graspable rim tangs is in being aligned with the bottle neck which literally is within the grasp of the user's hand. Figuratively, the user is holding a bottle not a machine, and accordingly, it feels more natural. It is also less likely that the bottle will be dropped out of the machine because one is quite simply less likely to drop a bottle clasped by the neck within a hand, than a bottle captured between a pair of grasped clamshell engagement arms extending perpendicularly from the bottle.

Another aspect of the single lever, two-cycle, manual corkscrew machine embodiment relates to a bail type (looping handle) crank coupled for rotating the spiral radius pinion gear about its pole axis, the loop of the bail encircling the body of the machine in a down "storage position" before being rotated backward ~180° in a first direction for translating (raising) the driver up relative to the annular collar of the machine to the initiating position of the two cycle operation.

Embodiments in accordance with the present invention provide operative advantages over the prior art as discussed above.

DETAILED DESCRIPTION

An interesting feature of a bottle neck stoppering cork is the force holding the cork in the bottle neck. There is a friction force which prevents the cork once compressed within the neck of the bottle from being removed. This frictional force is relatively large when the full length of the cork is inside the bottle neck and decreases to a relatively medium value when only a short length of the cork remains inside the bottle neck. For there to be equal removal force required at the start of removal of the cork as there is at the end of removal of a cork, there must be a mechanism for adjusting the removal force applied which is resisted by the cork to bottle neck frictional force. Since the force is high at the start of removal and low at the end of removal, a mechanism which would provide a continuous variation in force using variable lever arm lengths around a pivot point is a spiral gear which provides a variable lever arm depending on the angular orientation of the spiral with respect to the member to which force is being applied.

Mathematically, a spiral is a transcendental plane curve, for which the equation in many cases can be written in a general form in polar coordinates as: $r=a_0\Theta^n+a_1\Theta^{n-1}+\ldots a_n$. A spiral can also be defined as a locus of a point which moves about a fixed axis, while its radius vector r and its vectorial angle Θ continuously increase or decrease according to some rule. [See Van Nostrand's *Scientific Encyclopedia* $8^{th}$ 1995, p. 2929.]

The classical Archimedes spiral is expressed by the relationship: $r=a\Theta$ which where the spiral has an initial radius $r_1$ (where Θ is 0) becomes:

$$r=r_1+a\Theta.$$

Another famous spiral is the logarithmic spiral which in polar coordinates is given by the relationship:

$$r=ke^{b\Theta};$$

where k and b are arbitrary constants. The logarithmic spiral is also known as a growth spiral, an equiangular spiral, and a spira mirabilis. Similarly, if a logarithmic spiral has an initial radius $r_1$, the relationship is expressed as:

$$r=r_1+ke^{b\Theta};$$

Figure 5:
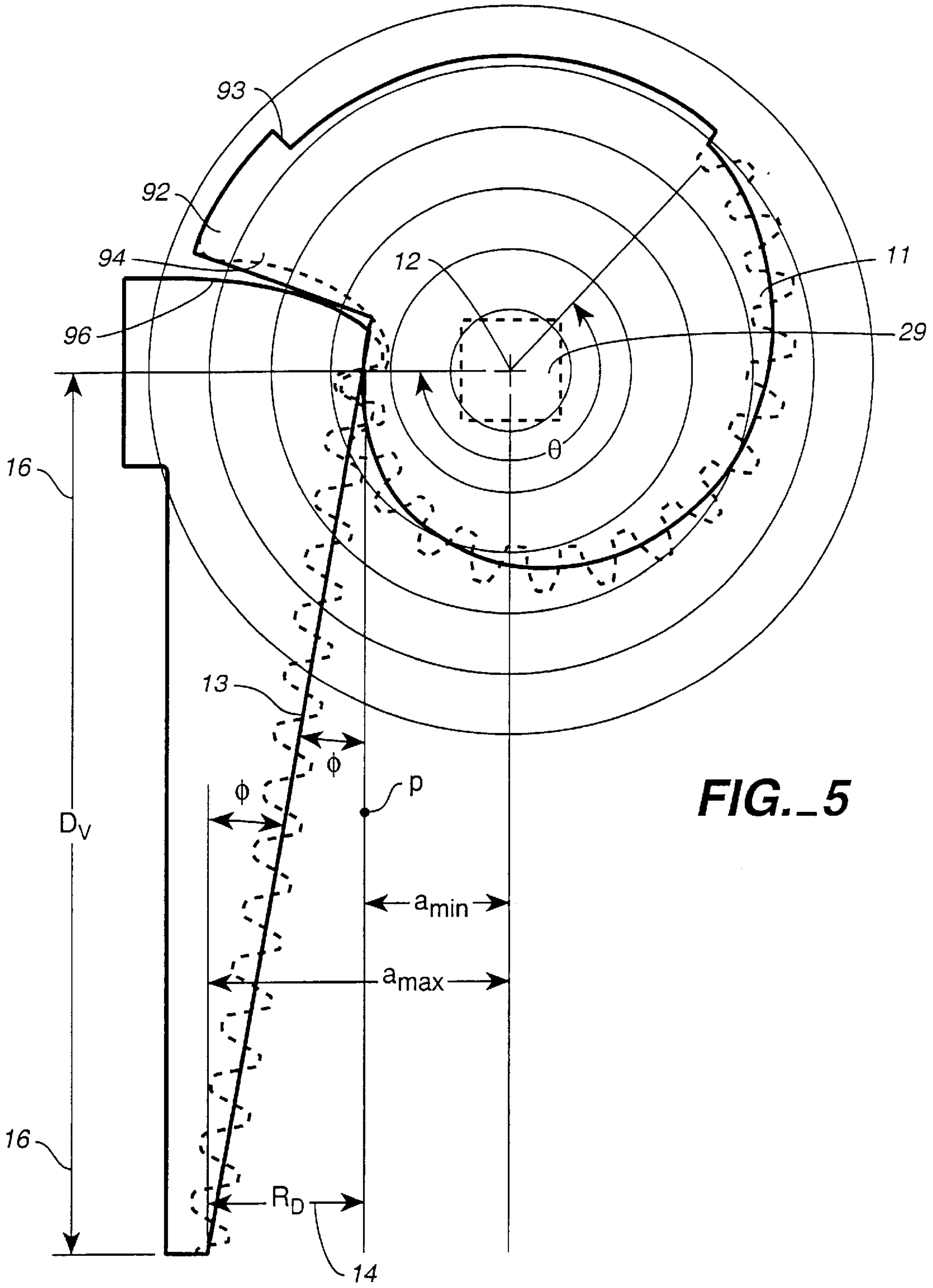
FIG. 5 is a diagram showing the relationship of the radius of the spiral radius pinion gear and angular rotation of that gear in the single lever, two cycle corkscrew machine according to the invention as the bail crank is rotated 180° from the down or rest position (gear engagement proximate a pole (axis)) spiraling outwardly from the pole to the open or initial operating position of the machine.

Looking at FIG. 5, a skilled mechanical designer should note that a spiral radius pinion gear 11 rotating through an angle Θ less than 2π radians (360°) about its polar axis 12 will drive or move a linear gear rack 13 vertically relative to the pole axis 12 as the gear mesh contact radius moves radially outward. The relative radial displacement (position), $R_D$, of the gear rack contact line to the pole axis 12 of the spiral radius pinion gear 11 (indicated by arrow 14) is always equal to the difference between the minimum radius $a_{MIN}$ and maximum radius, $a_{MAX}$ of the spiral for the rotation through angle Θ, or:

$$R_D=(a_{MIN}a_{MAX})$$

When the linear gear rack 13 is inclined at an angle relative to, for example, a vertical plane, and is constrained to only translate in that vertical plane relative to the pole axis 12 of the spiral radius pinion gear 11, then the inclination angle Φ, (the angle which the rack must be inclined relative to the vertical plane) has a relationship to the magnitude of a desired or resulting vertical translation $D_V$ (indicated by the arrow 16) and the relative radial displacement $R_D$, namely:

$$\tan\Phi=(R_D/D_V),$$

and $$\cos\Phi=(D_V/L_{Rack}),$$

where $L_{Rack}$ is the effective length of the gear rack 13.

To illustrate, when the pole axis is at the position shown in FIG. 5, the vertical line ρ correlates to the relative radius r of the spiral pinion gear 11 and is positioned between its minimum radius (though in this view it is positioned at the minimum radius) and maximum radius $a_{MIN}$, $a_{MAX}$, and is related to the inclination angle Φ of the gear rack 13 by a relationship of the form:

$$r = a_{MIN} + k \cdot \Theta \cdot \sin \Phi,$$

where Θ is expressed in radians, and k is a factor correlating circumference of a circle to the length of the particular spiral. It is also clear, that the effective length of the gear rack 13 is equal to the arc length of the spiral radius pinion gear 11 for the rotation through angle Θ.

The skilled mechanical designer should also understand that the combination of a spiral radius pinion gear 11 and an inclined rack 13 provides mechanical advantage analogous to that of rolling a cylinder up an inclined plane for implementing a required resisted perpendicular displacement. A crank arm rotating the spiral radius pinion gear also has maximum mechanical advantage when the spiral radius of pinion gear 11 engages the inclined gear rack 13 at its minimum radius, ($a_{MIN}$). Conversely, the mechanical advantage of such a crank arm is minimized when the spiral radius of pinion gear 11 engages the inclined gear rack 13 at its maximum radius, ($a_{MAX}$).

In other words, the mechanical advantage (effective length) of the crank arm continuously increases as the radius of the contact circle (arc) of the gear mesh between the rack and pinion spiral inwardly toward the pole axis 12 of the rotating pinion gear 11, and continuously decreases as the radius of the contact circle (arc) of the gear mesh between the rack and pinion spirals outwardly from the pole axis 12. Other properties and advantages of the described spiral radius pinion gear—inclined gear rack mechanism relate to inherent acceleration or deceleration as the contact point (and therefore radius) of gear engagement spirals respectively outwardly or inwardly, for any given angular velocity of the crank arm.

A single lever, two cycle, manual corkscrew machine as shown in the Figures provides a very good example of a spiral radius pinion gear—inclined gear rack machine. The mechanism is particularly suited for addressing the problem of screwing a helical worm (corkscrew) into a cork acting as a stopper for a bottle neck, then pulling the skewered cork from the bottle neck and finally stripping the pulled, skewered cork from the helical worm of the corkscrew. In particular, looking at FIGS. 4A–4E, the resistance encountered screwing a corkscrew 21 into a cork 22 increases with depth of penetration of the helical worm into the cork. The mechanical advantage of crank 23 rotating the spiral radius pinion gear 11 engaging the inclined gear rack 13 increases as the gear mesh associated with the contact circle between the gears and the vertical line ρ correlating to the radial position of the instantaneous contact point, spirals inward translating the driver (member) 24 coupled to the inclined rack 13 downward. The resistance when pulling the cork 22 and when stripping the fully skewered cork off the corkscrew 21 is greatest, respectively, when the cork is fully within the bottle neck 27 and when the corkscrew is at skewered depth in the cork is at its maximum. The resistance encountered decreases in each instance as the cork 22 is pulled from the bottle neck 27 and as the cork is stripped from the corkscrew 21. The mechanical advantage of crank 23 rotating the spiral radius pinion gear 11 is greatest at its minimum radius $a_{MIN}$, and decreases as the engagement of spiral radius pinion gear 11 spirals outward to its maximum radius $a_{MAX}$. The fact that the vertical translation of the driver 24 decelerates as the corkscrew 21 is screwed into the cork 22 and then accelerates as the cork is pulled and stripped from the cork screw adds to the fascination and facility of the machine. It just could be the perfect manual corkscrew.

Figure 1:
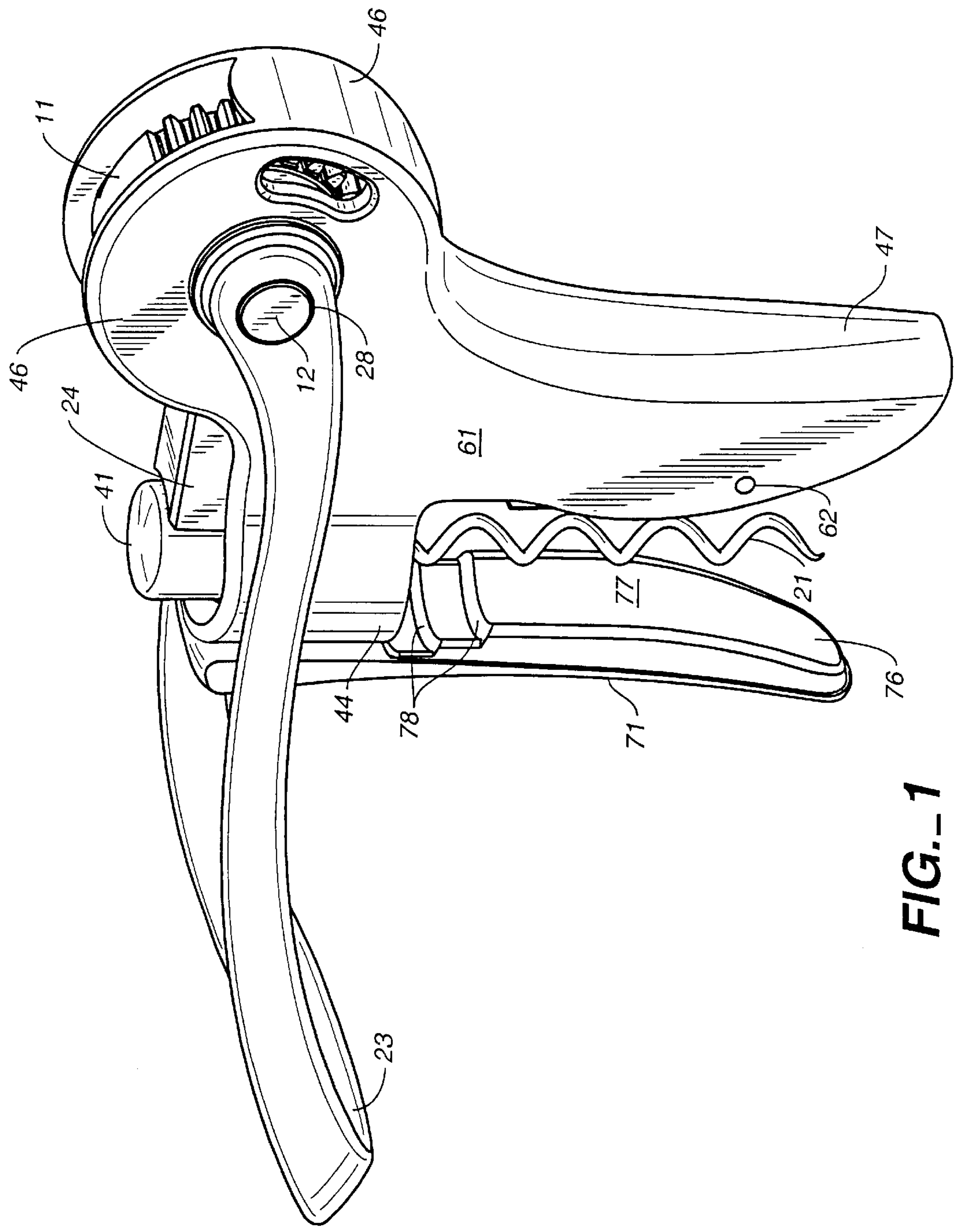
FIG. 1 is a perspective view of an embodiment according to the invention showing a single lever, two cycle, manual corkscrew machine in the down or storage position.
Figure 2:
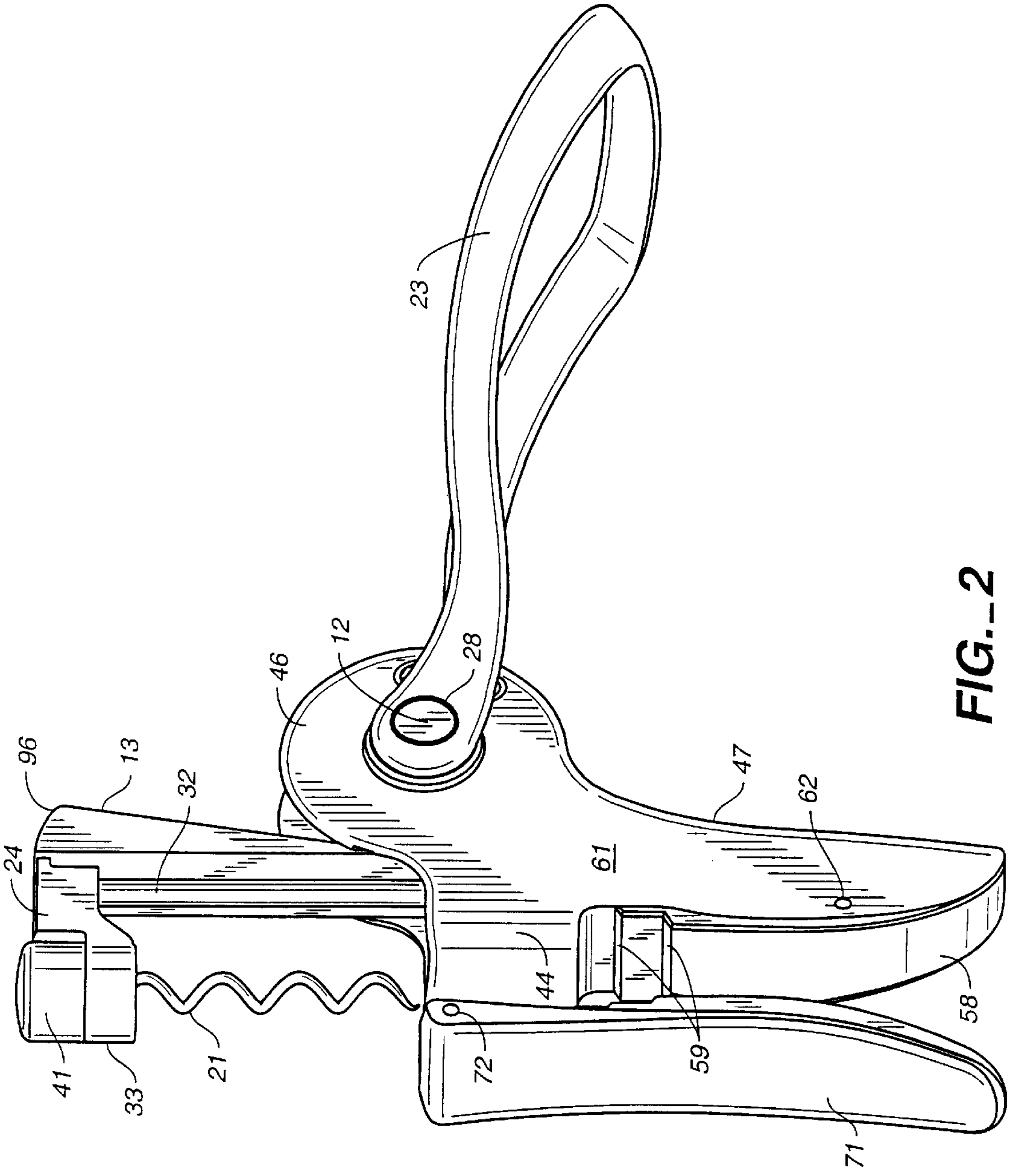
FIG. 2 is a quarter side elevation view of the single lever, two cycle, manual corkscrew machine of FIG. 1 in the open or initial position of the two cycle operation.

Looking at FIGS. 1, 2, 3A–3E, and 4A–4E, the single lever (crank) 23 of the two cycle corkscrew machine is in the form of an elongated U-shaped bail (FIGS. 1 & 2). The respective ends of the bail lever 23 mechanically receive and couple with respective ends 28 of a square cornered pinion axle 29 extending through a complementarily shaped polygonal hole 31 extending through the spiral radius pinion gear 11 centered (coaxial) with its pole axis 12 (see FIGS. 4A–4E). As illustrated, an angle of rotation Θ (FIG. 5) of the single lever 23 between the down or storage position (FIG. 1) and the open position (FIG. 2) is slightly greater than 180° or π radians.

Advantages of the bail configuration of the lever arm 23 include the fact that the top end of the corkscrew machine is encircled in the down position making the machine more compact when stored. Another advantage is that arms of the bail lever straddle a vertical plane bisecting the machine and any captured and held bottle 26, such symmetric mounting tends to eliminate torque twisting the machine perpendicularly with respect to that vertically bisecting plane as the single lever 23 is operated. Finally the loop like bail configuration of the lever arm 23 allows the top of the machine to be encircled as the lever arm is rotated between the down and up positions. This arrangement mitigates if not completely eliminates structural limitations which might otherwise impede lever arm rotation. In fact, the bail configuration permits the rotation of the lever arm 23, for rotating the spiral radius pinion gear to be more or less ergonomically centered or balanced with respect to a person grasping the machine in one hand with a bottle while turning the single lever arm 23 back and forth in two cycles across the top of the machine with the other hand.

Ideally, the driver (member) 24 of the single lever, two cycle, corkscrew machine embodiment is integrated with the inclined gear rack 13 forming a single machined or cast structure having a mounting passage or receptacle for rigidly securing a vertical guide stem 32 located between an annular head 33 and the structure of the inclined gear rack 13. A conventional corkscrew thrust bearing top 34 is coaxially received and conventionally mounted in a cylindrical sleeve throat 36 of the annular head 33 of the driver 24. An extending circular flange 37 below the thrust bearing plate 38 is corralled between a smaller diameter annular rim 39 of the sleeve throat 36 and an end cap 41 adapted to screw onto, covering the end of the cylindrical throat. A beaded bearing surface 40 centrally located in the end cap 41 minimize friction resistance to corkscrew rotation as the corkscrew is driven into a cork 22 during which time the thrust bearing plate 38 presses against the beaded bearing surface 40. [See Allen (supra) Col. 6, ll. 2–64] The axis of rotation of the corkscrew 22 is vertically oriented, and coaxial with the axis of the annular head 33, parallel to the vertical guide stem 32.

In the open position, the tip of the corkscrew 21 extends downward from the driver 24 into a conventional collar cam 25 adapted to follow the helically curved worm of the particular corkscrew. The collar cam 25 is received and secured within a collar cam carrier 52 which in turn is coupled to and translatable on the guide stem 32. The collar cam 25 does not rotate, but rather is stationary and as such acts as a mechanically blocking member which imparts a torque to the helical wire of the corkscrew which causes the corkscrew 21 to rotate as the driver 24 moves relative (vertically toward and away from) the collar cam carrier 52. The collar cam carrier 52 is secured at a rest position 49 within a stationary annular collar 44 forming a portion of the support structure for the moveable pieces of the machine.

Figure 6:
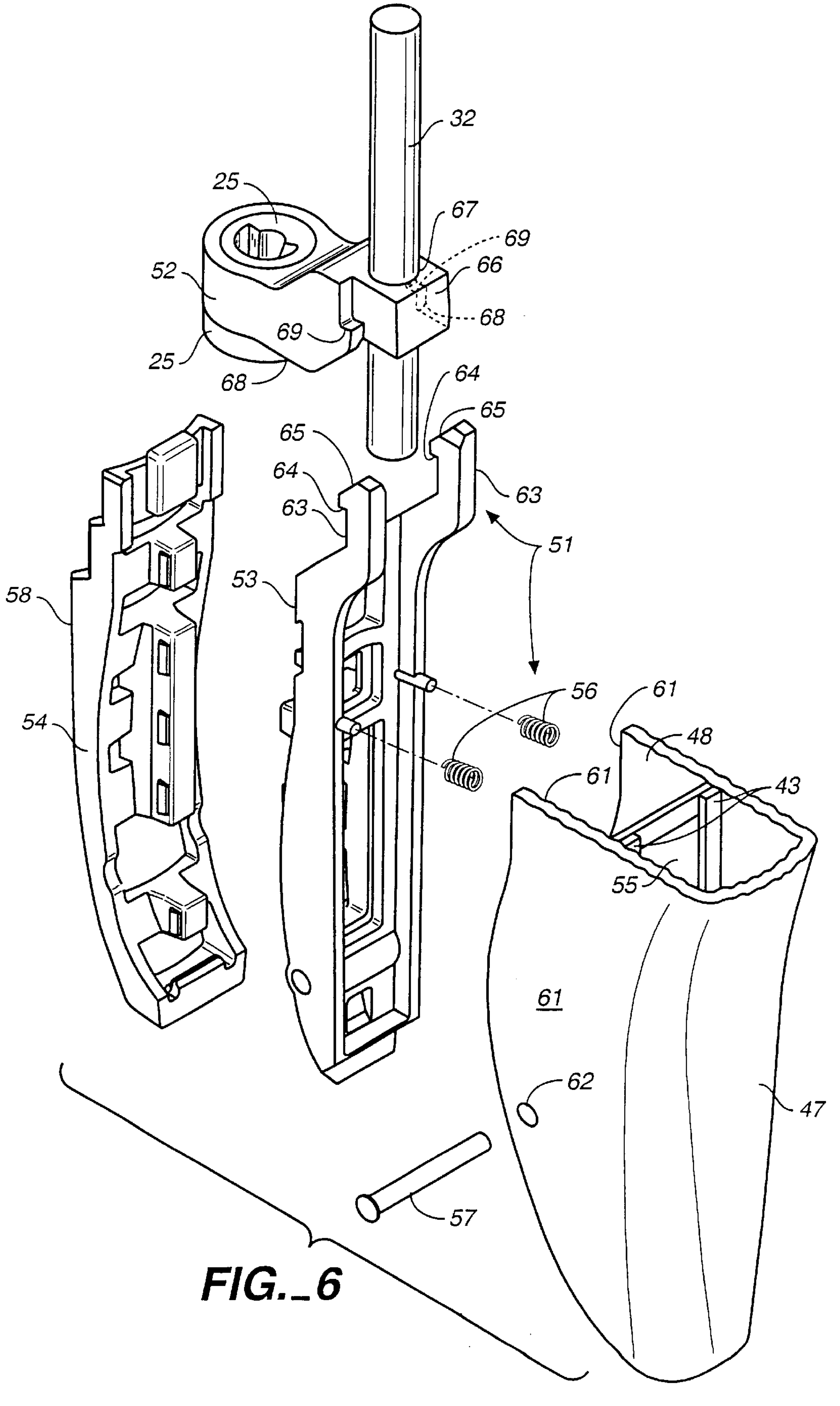
FIG. 6 is an exploded perspective view showing the relationship of a collar cam carrier translatable on the guide stem of the driver and an associated latch member for capturing holding and releasing the collar cam carrier from the rest position within the annular collar of the single lever, two cycle manual corkscrew machine embodiment according to the invention.

Per the teachings of Allen [U.S. Pat. No. 4,253,351, col. 13, ll. 7 to col. 14, ll.47], the collar cam carrier 52 has a cylindrical bore 67 receiving the guide stem 32 (FIG. 6) shaped to allow the guide stem 32 to easily translate though it on downward translation, and to cant, bind onto and travel with the guide stem 32 upon upward translation of the guide stem 32 except when the carrier is latched at the rest position 49 atop the annular collar 44 of the machine. When the collar cam carrier 52 translates with the guide stem 32 there is no relative motion between the driver 24 and the collar cam 25, hence, no torque is imparted which tends to rotate the corkscrew 21 relative to a skewered cork 22 or the drive 24.

The downward extending vertical guide stem 32 and downward extending structure of the inclined gear rack 13 of the driver 24 of the manual corkscrew machine are received and vertically translate in complementarily shaped guide tracks 42 and 43 in and through one side of the stationary annular collar 44 of the machine aligning the axis annular collar 44 coaxially with the longitudinal axis of the helical corkscrew 22.

In more detail, the stationary annular collar 44 which is a main structural member of the corkscrew machine is ideally a unitary structure including upward extending spaced, parallel, flared circular yoke structures 46 and a downward projecting rim tang housing 47 with flanges 61. The yoke structures 46 are adapted for mechanically receiving, supporting and protecting the spiral radius pinion gear 11. A square cornered pinion axle 29 carrying the spiral radius pinion gear 11 is supported for rotation between the yoke structures 46 using conventional sleeve bearings (not shown). The engaging ends of the single bail lever 23 couple to the ends of the pinion axle ends exterior the yoke structure 46. The rim tang housing 47 of the annular collar 44 extends downward from the collar 44 directly below the flared yoke structures 46. The rim tang housing 47 has a rounded, smooth, exterior surface with side flanges 61 to provide interior space 48 for receiving, enclosing and guiding the translating distal ends of the guide stem 32 and gear rack 13 translating with the driver 24.

Looking at FIGS. 1 & 4A–4E the yoke structures 46 enclosing the spiral radius pinion gear 11 provide a interior raised stop 91. The heel 92 of the pinion gear 11 rotating within between the yoke structures 46 presents a radially projecting shoulder 93 located for striking the stop 91 to stop or limit backward rotation of the pinion gear 11 at the point which the corkscrew machine is in its open position, and the engagement of the pinion gear 11 with the inclined gear rack 13 is at its maximum radius. The spiral radius pinion gear 11 also presents a stepped face 94 between the maximum radius and minimum radius which cooperates with the top end 96 of the inclined gear rack 13 to stop or limit forward rotation of the pinion gear 11. The pinion gear 11 when secured by the pinion axle 29 within and between the yoke structures 46 mechanically couples the integrated driver 24 inclined gear rack 13 structure to the annular collar 44 forming the base of the machine with the downward extending guide stem and of the gear rack 13 ends received in their respective complementary shaped guide tracks 42 and 43 through the annular collar 44 forming the base of the machine.

The interior of the rim tang housing 47 houses and supports the mechanical components of the biased, releasable collar latch mechanism 51 (FIG. 6) that capture and hold a collar cam carrier 52 at the rest position 49 within the annular collar 44. In particular with reference to FIG. 6, the biased, releasable collar latch mechanism 51 of the single lever, two cycle, manual corkscrew machine includes a rocker 53, a face plate 54, and biasing springs 56. A pivot axle 57 journaled between the flanges 61 couples and supports the rocker 53 near its bottom within the rim tang housing 47. The face plate 54 has a concave arcuate inward exterior face 58 with shoulder lands 59 stepped radially inward (toward the axis of the annular collar 44 as shown in FIG. 2) in downward succession. The face plate 54 is adapted to snap into the rocker 53 to form a single integrated structure which rocks within the rim tang housing 47 (FIGS. 4A–4E) pivoting on the axle 57 The pivot axle 57 (FIGS. 1, 2, & 3A–3E) is supported perpendicularly with respect to the axis of the collar 44 between the enclosing flanges 61of the rim tang housing 47. In the embodiments illustrated, holes 62 are drilled through the enclosing flanges 61 for supporting the distal ends of the axle 57. The biasing springs 56 are compressed between the rocker 53 and a back interior wall 55 of the rim tang housing 47 (FIGS. 4A–4E) for urging the top end of the rocker 53 radially inward with respect to the axis of the annular collar 44.

The top end latch arms of the rocker 53 straddle the guide stem 32 guided through the annular collar 44 of the machine traveling with the driver 24. Each latch arm 63 is disposed on one side of the guide stem 32. The latch arms 63 have downward facing horizontal latch surfaces 64 oriented perpendicular to the guide stem 32, and upward facing strike surfaces 65 acutely inclined relative to the latch surfaces 64. The stem 66 of the collar cam carrier 52 surrounds the bore 67 (adapted per the teachings of Herbert Allen (supra)) to be translatable along the guide stem 32, and presents on opposite sides of the guide stem 32, complementary downward facing inclined strike surfaces 68 and upward facing horizontal latch surfaces 69 also oriented perpendicular to the guide stem 32.

Figure 3A:
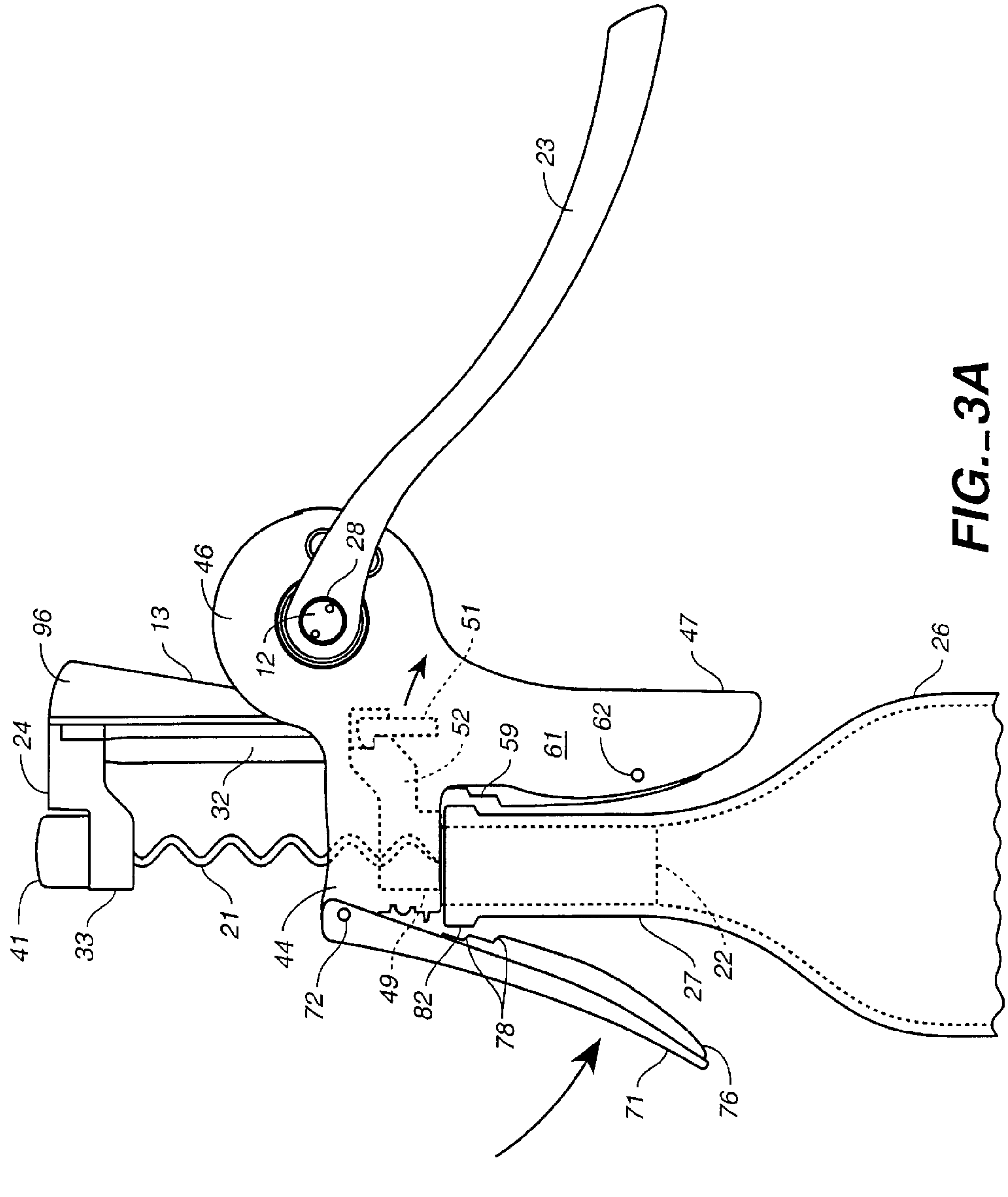
FIG. 3A is a side elevation view of the embodiment of FIG. 1 showing the bail crank of the device rotated backward ~180° from the storage position to an open or an initial position of the two cycle operation of the machine, just before the downward extending graspable rim tangs are grasped in one hand to capture and hold a bottle neck at a stationary position relative to the annular collar of the machine.
Figure 3B:
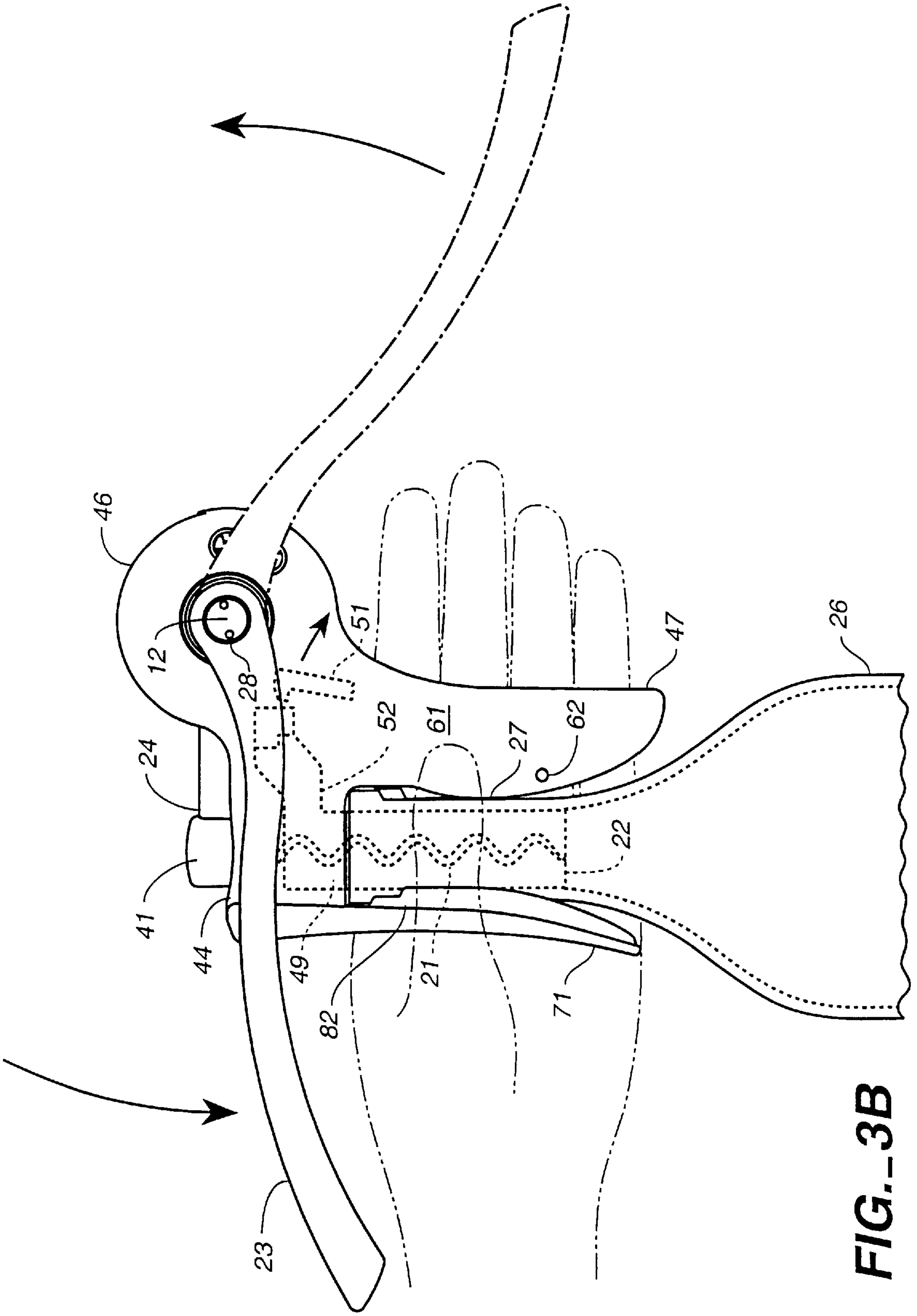
FIG. 3B is a side elevation view of the embodiment of FIG. 1, showing the bail crank rotated forward ~180° from the position of FIG. 3A to a down position where the cork in the bottle is shown skewered by a helical corkscrew of the machine (the hand could be engaged from the opposite side)
Figure 3C:
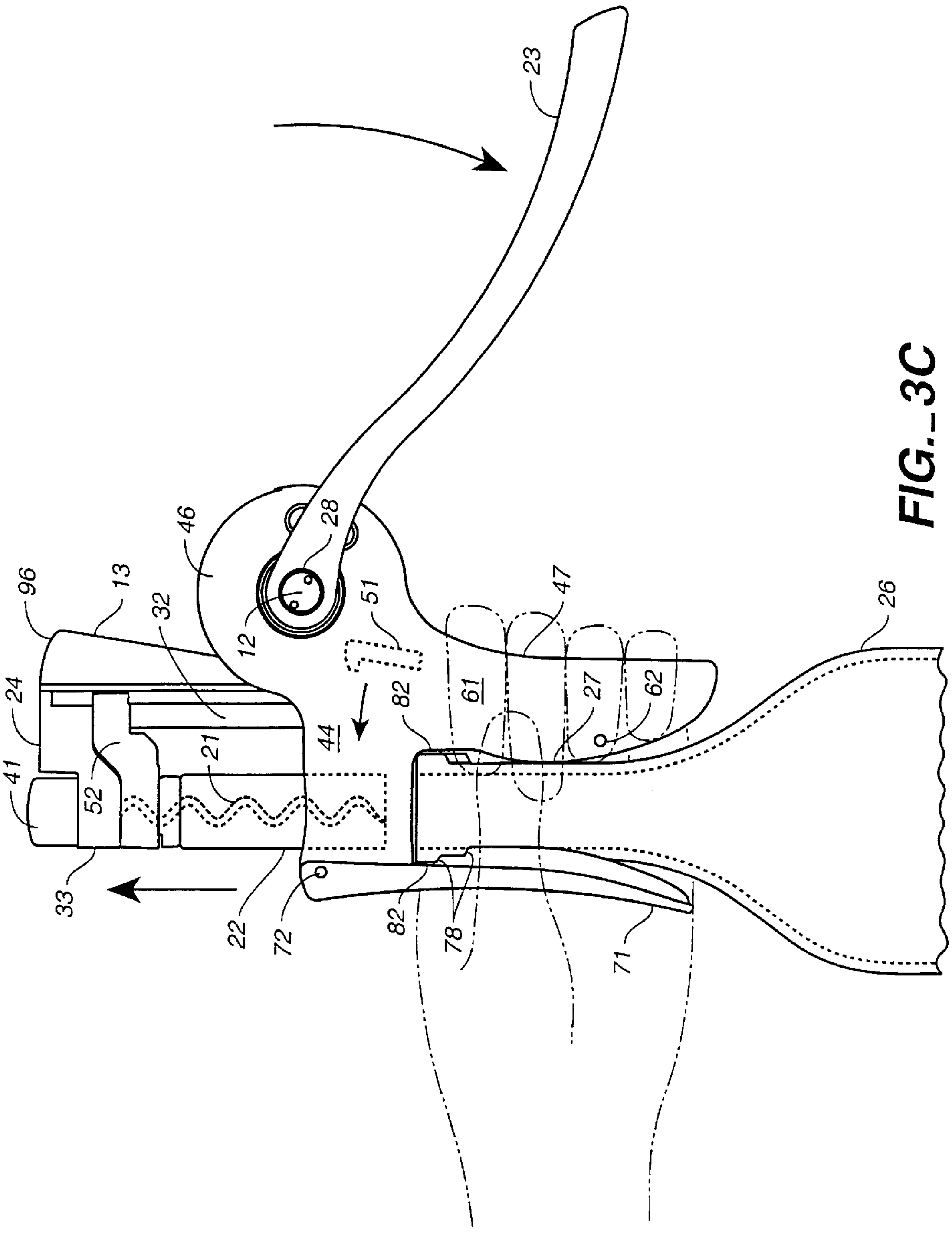
FIG. 3C is a side elevation view of the embodiment of FIG. 1, showing the bail crank rotated backward ~180° to the open position translating a driver (member) upward with the skewered cork having been pulled from the bottle.

Looking at FIGS. 3A–3E the releasable collar latch mechanism 51 operates conventionally. The cam collar carrier 52 is latched at a rest position 49 seated on a portion of the stationary annular collar 44 of the corkscrew machine with the collar cam 25 extending slightly down toward the position of a bottle neck all within the interior cylindrical volume defined within the annular collar 44. The biasing springs 56 maintain the latch engagement until a bottle rim 82 is grasped and captured within the machine below. As a user squeezes the rocking rim tang 71, the neck of the captured bottle presses on the annular collar 44 and causes the rocker 53 to rock backward, causing its downward facing horizontal latch surfaces 64 to move out of engagement with the upward facing horizontal latch surfaces 69 of the collar cam carrier 52 (FIGS. 3A and 3B). The bail crank 23 is in the open position. The bail crank 23 is then rotated forward moving the driver 24 downward. The cam collar carrier 52 and collar cam 25 resting on the annular collar 44 do not move. Translation of the corkscrew 21 downward through the stationary collar cam 25 imparts a torque rotating the corkscrew screwing it into the cork 22 acting as a stopper for the bottle 26 (FIG. 3B). The bail crank 23 is then rotated backward to the open position, and because the latch mechanism 51 is disengaged (the bottle rim 82 is still grasped and held within the machine) the collar cam carrier binds to the guide stem 32 and moves upward with the driver 24. Since there is no relative movement between the driver 24 and collar cam carrier 52, no torque is induced tending to rotate the corkscrew 21, and the cork 22, skewered by the corkscrew 21 is pulled from the neck 27 of the bottle 26 (FIG.

Figure 3D:
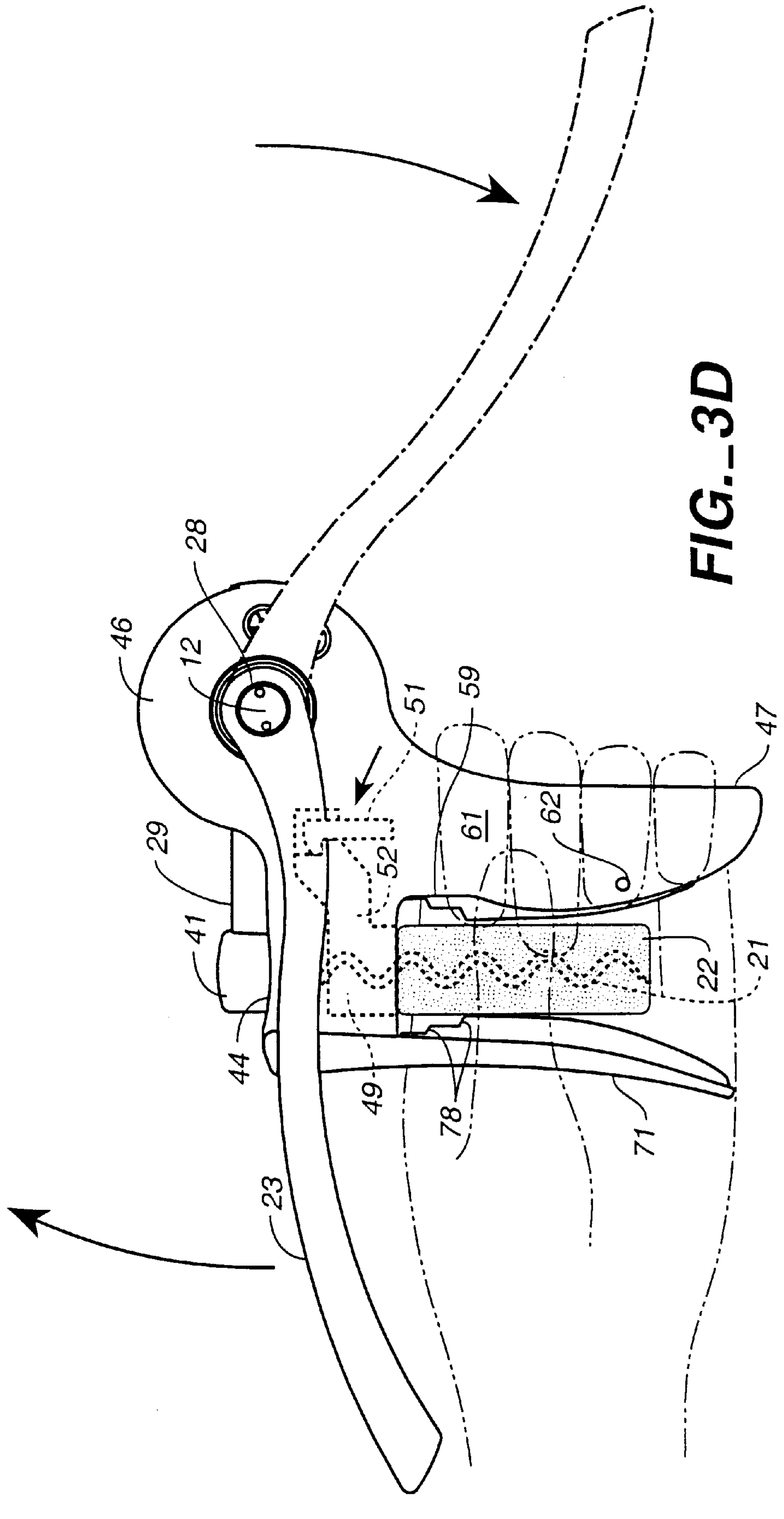
FIG. 3D is a side elevation view of the embodiment of FIG. 1, with the bail crank rotated forward ~180° to a down position translating the driver (member) downward with the skewered cork to the down position, in a second portion of the operation cycle of the machine.
Figure 3E:
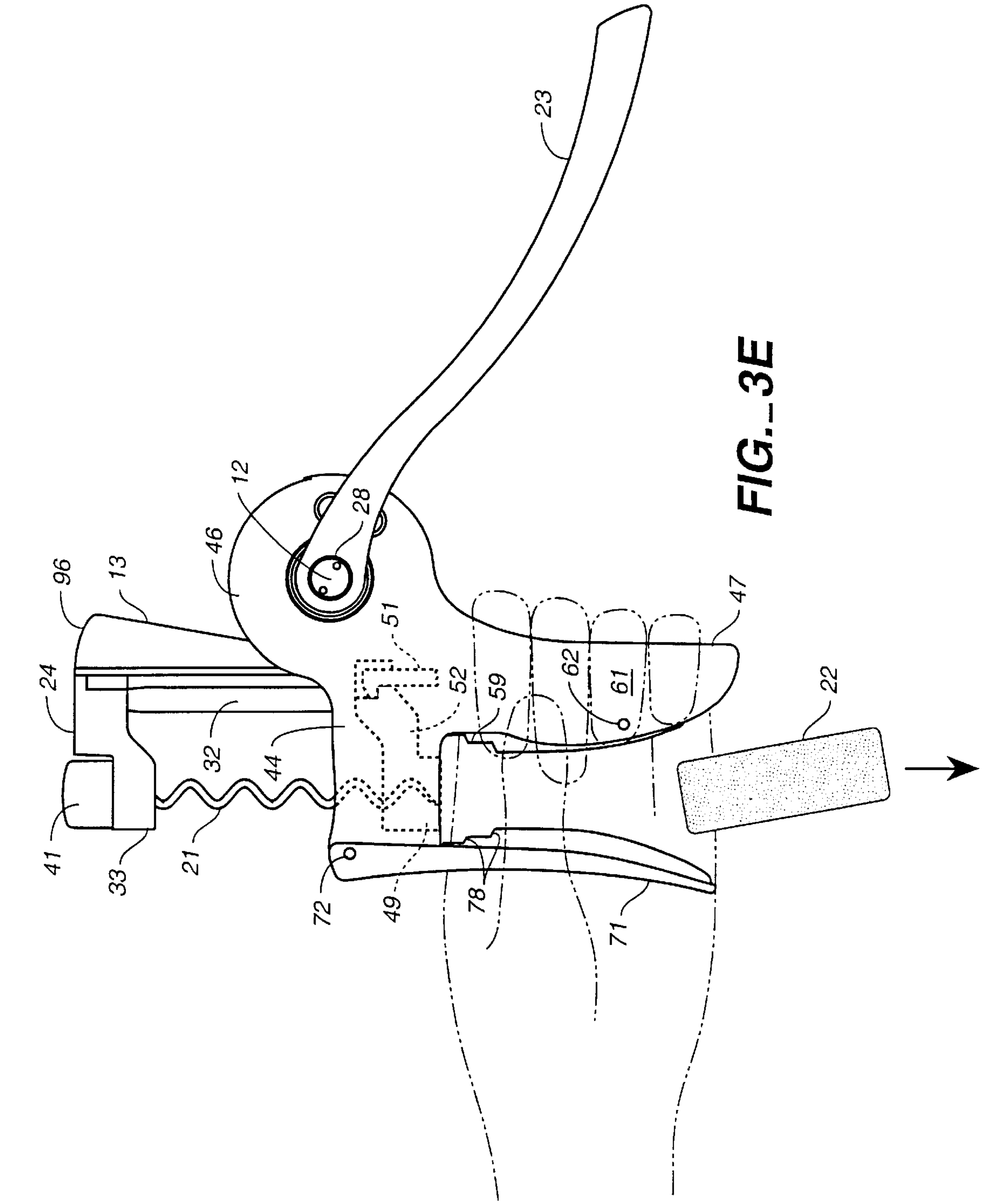
FIG. 3E is a side elevation view of the embodiment of FIG. 1, with the bail crank rotated backward ~180° to the open position translating the driver (member) upward, a collar cam which in this configuration is latched within the annular collar, strips the skewered cork from the corkscrew concluding the second portion of the operation cycle of the machine.
Figure 4A:
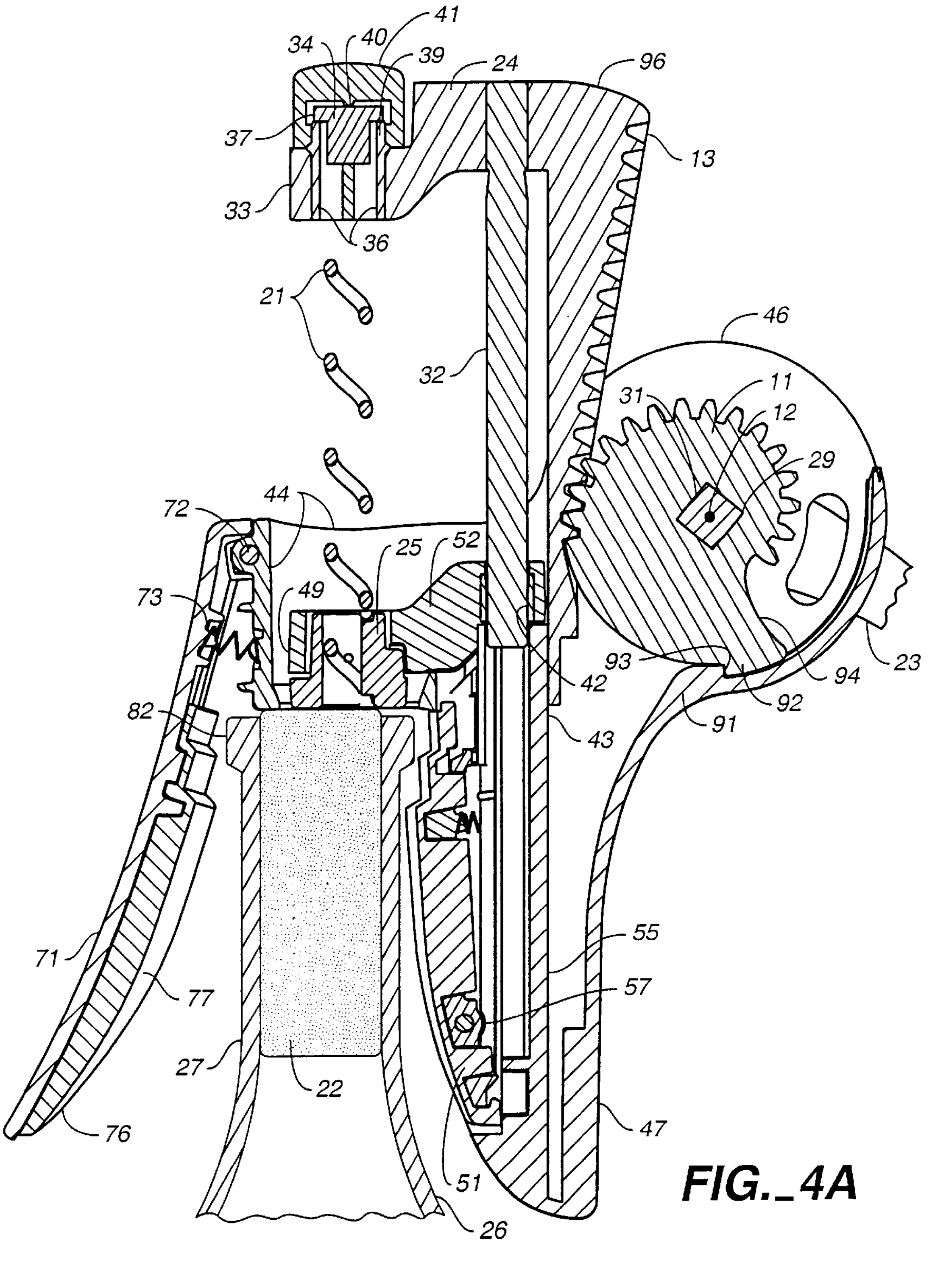
FIG. 4A is a cutaway side elevation section of the configuration initiating an open position of the first portion of the cycle operation of the machine correlating to that shown in FIG. 3A.
Figure 4B:
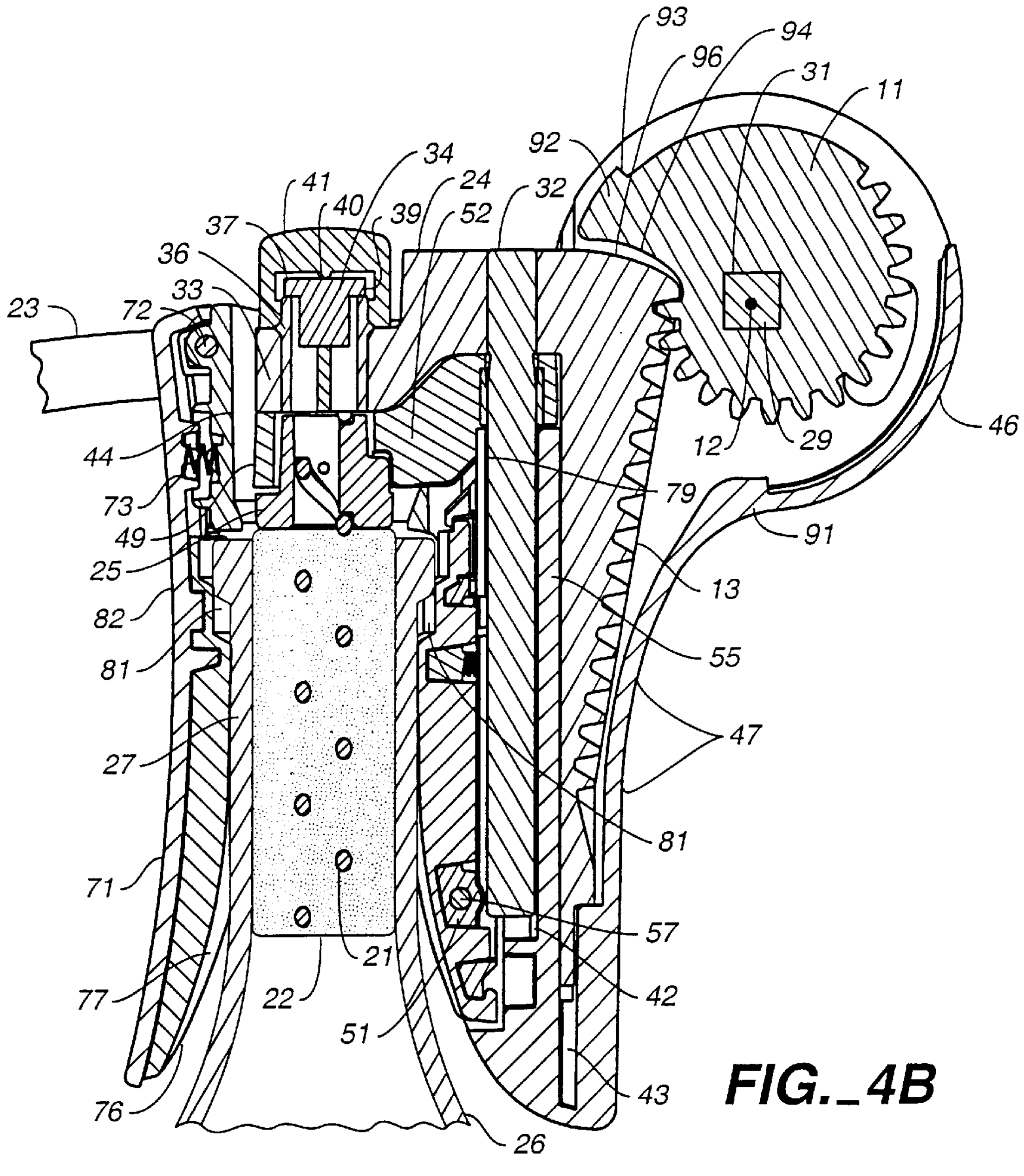
FIG. 4B is a cutaway side elevation section of the single lever, two cycle, corkscrew machine showing the bail crank rotated forward ~180° to the down position correlating to the position shown in FIG. 3B.
Figure 4C:
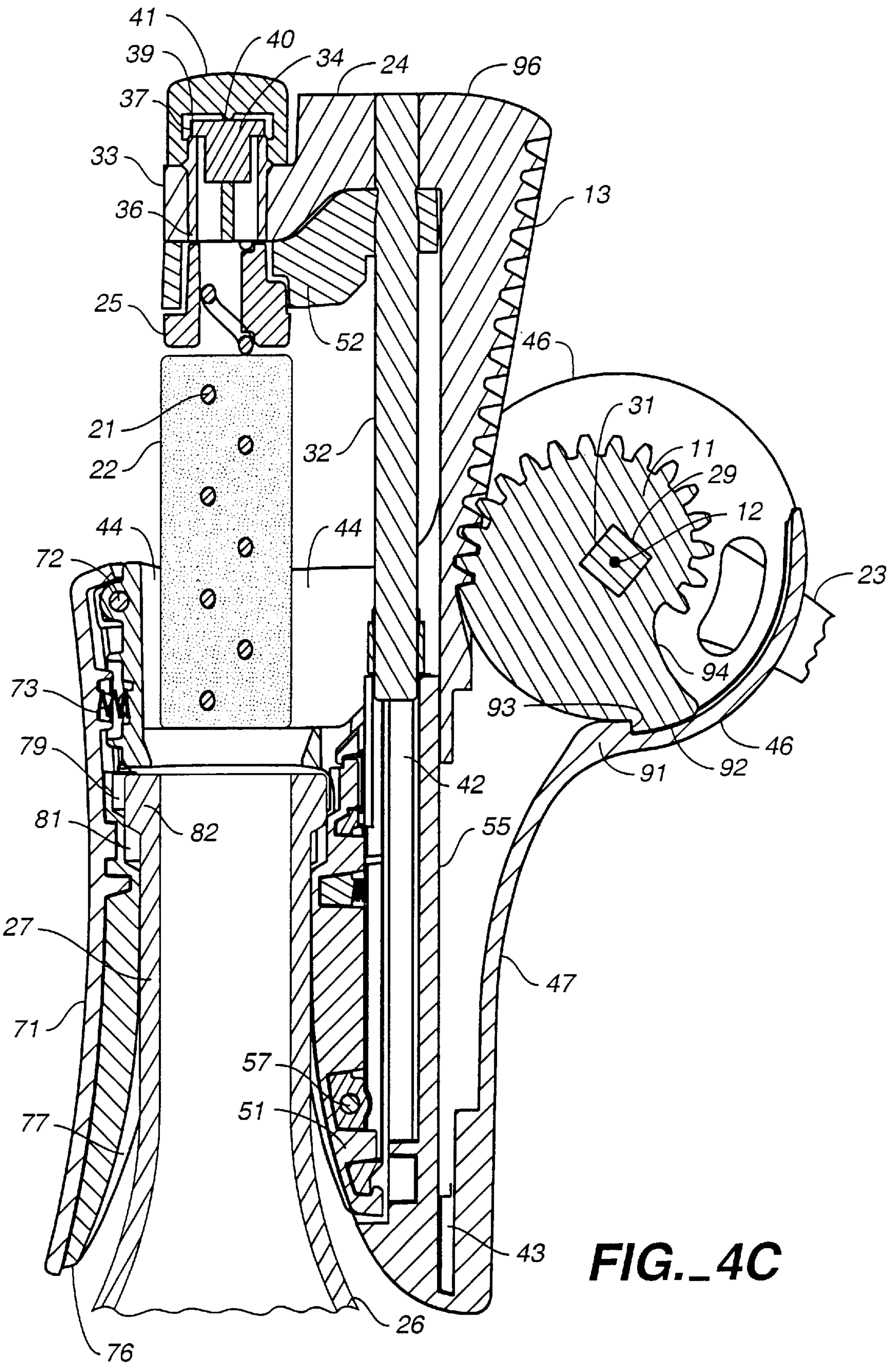
FIG. 4C is a cutaway side elevation section of the single lever, two cycle, corkscrew machine showing the bail crank rotated backward ~180° to the open position pulling the cork from the bottle correlating to the position shown in FIG. 3C.
Figure 4D:
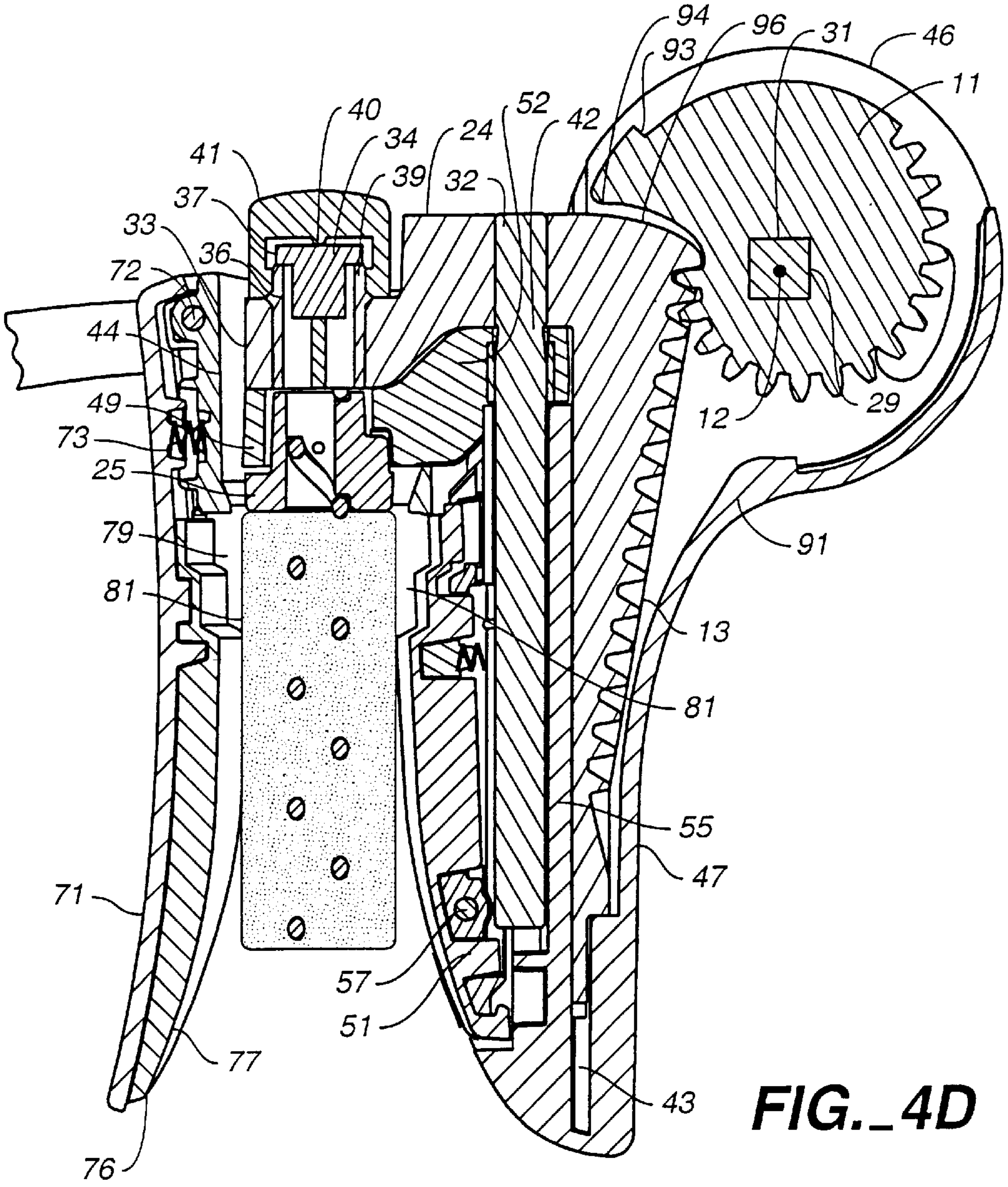
FIG. 4D is a cutaway side elevation view of the single lever, two cycle corkscrew machine with the bail crank rotated forward ~180° to the down position translating the driver (member) and skewered cork downward to the down position in the second portion of the operation cycle of the machine after the opened bottle has been removed, this correlates the configuration shown in FIG. 3D.
Figure 4E:
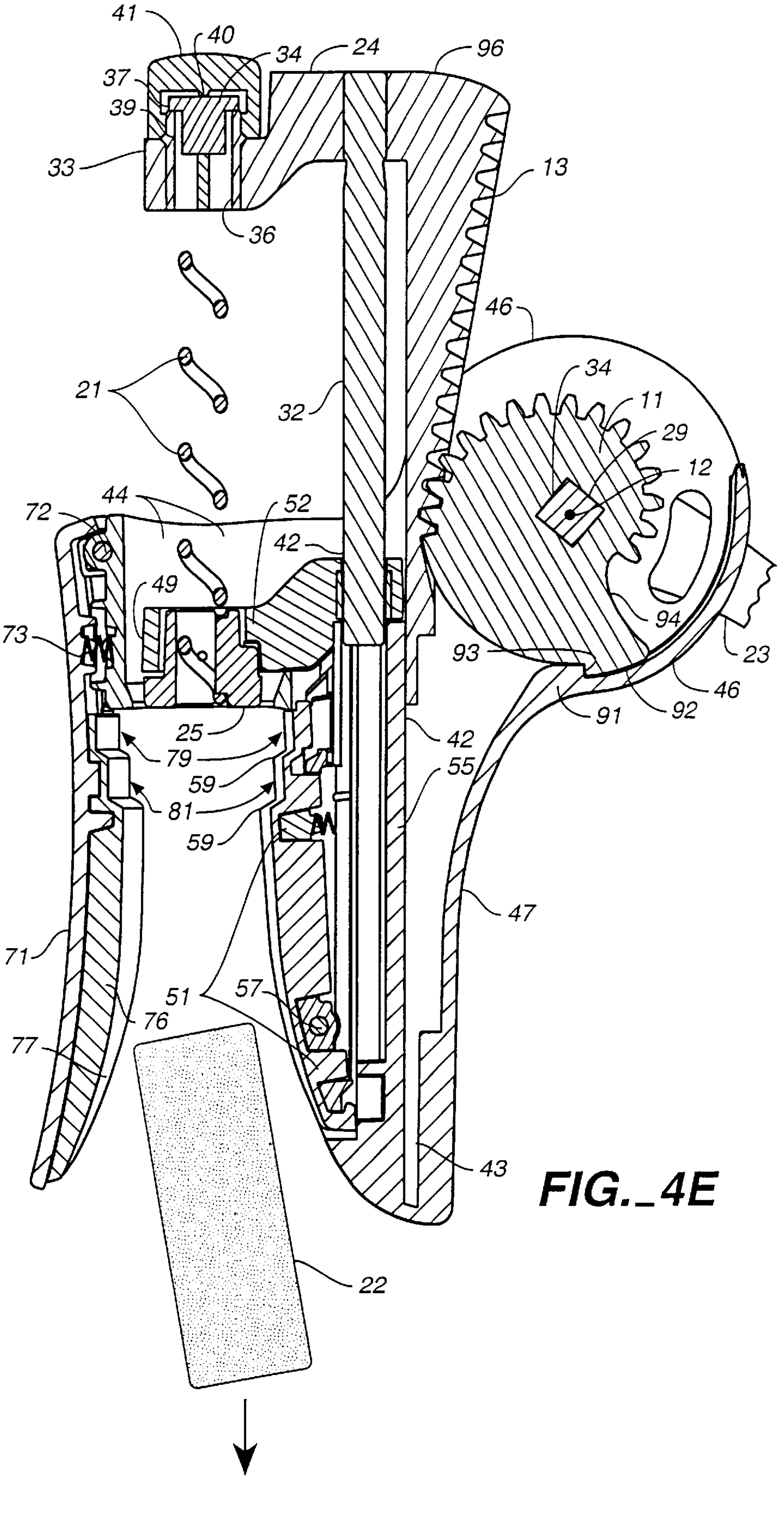
FIG. 4E is a side elevation view of the single lever, two cycle corkscrew machine with the bail crank rotated back ~180° to the open position translating the driver (member) upward, the collar cam now latched within the annular collar having stripped the skewered cork from the corkscrew concluding the second portion of the operation cycle of the machine and correlating to the configuration shown in FIG. 3E.

3C). The bottle 26 is then separated from the machine, and the rocker 53, urged by the biasing springs 56 rocks back to the latch engagement position. The bail crank 23 is then rotated forward beginning the second lever cycle, which moves the driver 24, collar cam carrier 52 and cork 22 downward into and through the stationary annular collar 44. The downward facing inclined strike surfaces 68 on either side of the stem 66 of the collar cam carrier 52 strike the upward facing inclined strike surfaces 65 of the respective latch arms 63 rocking the rocker 53 backward, until the respective horizontal latching surfaces 64 & 69 move just past registry, whereupon the biasing springs 56 rock the rocker 53 forward engaging the latch mechanism 51 (FIG. 3D). With the latch mechanism 51 engaged, the bail crank 23 is then rotated back to the open position moving the driver upward. The collar cam carrier 52 and collar cam 25, held by the latch arms 63 of the rocker 53 remain seated on portion of the annular collar 44 of the machine. The upward translation of the corkscrew 22 through the collar cam 25 imparts torque that screws the helical corkscrew 21 out of the cork 22 (FIG. 3E).

Referring back to FIGS. 4A–4E, the single lever, two cycle, manual corkscrew machine includes a rocking rim tang 71 attached at its top to the exterior of annular collar 44 diametrically opposite the rim tang housing 47 pivoting on an axle 72. A biasing spring 73 is compressed between the interior face 74 of the rocking rim tang 71 and the exterior of the annular collar 44 for urging the tang 71 radially outward with respect to the axis of the annular collar 44. Like the face plate 54 snapped into the rocker 53 housed between the flanges of the opposing rim tang housing 47, the rocking tang 71 also includes a removable face plate 76 with a concave arcuate exterior surface 77 with similarly located shoulder lands 78 stepped radially inward in downward succession (toward the axis of the annular collar 44 as shown in FIG. 1).

As illustrated, when the respective tangs 47 & 71 of the single lever, two cycle, manual corkscrew machine are grasped within a user's hand (it can be from either side), the respective shoulder lands 59 & 78 of the respective face plates 54 & 76 cooperate to define two annular bottle rim channels 79 & 81 of decreasing diameter (FIGS. 4B–4E) in downward succession relative to the annular collar 44. The diameter of the larger bottle rim channel 79 is chosen for capturing the larger diameter rims 82 topping newer style wine bottles 26, while the smaller diameter annular channel 81 is chosen for corralling the smaller diameter rims typical of older style wine bottles.

The skilled designer should appreciate that having removable face plates 54, 76 within the respective tangs 47, 71 allows the single lever, two cycle, manual corkscrew machine to be adapted to different ranges of bottle neck rim diameters that may be encountered in different geographic regions of the world. However, the skilled mechanical designer should also appreciate that the magnitude of the desired vertical translation $D_V$ of the driver 24 necessarily includes the respective heights of any larger diameter bottle rim channels 79 between the lowest annular channel 81 and the annular collar 44 a factor which increases the effective length $L_{Rack}$ of the inclined gear rack 13 per the relationship expressed above. In particular, the desired vertical translation $D_V$ of the driver 24 of the single lever, two cycle, manual corkscrew machine is determined with respect to the range of cork lengths (1¼ inches (3 cm) to 1¾ inches (4.5 cm) in the United States) expected plus the respective height of the larger annular bottle rim channel 79 (⅜ inch (1 cm)). In other words, the desired vertical translation $D_V$ of the driver 24 of the single lever, two cycle, manual corkscrew machine must be sufficient to fully skewer a cork 22 acting as a stopper for a bottle 26 captured and held in the lowest annular bottle rim channel 81.

Successively smaller bottle rim channels 79–81 in downward progression also has advantages to users of the machine. In particular, the larger diameter bottle rim 82 captured in the topmost annular (large) channel 79 when grasped in a hand between the tangs 47 & 71 are less likely to be dropped, as the user rotates the bail crank 23 forward screwing the corkscrew into the cork 22 acting as a stopper for the bottle. The lower smaller annular channel 82 affords the user a second capture opportunity, in the event the bottle slips from the upper channel 79. Moreover such stepped bottle rim annular capture channels 79 & 81 afford the sporting user a greater opportunity for flamboyance, in that the bottle 26 need not necessarily be supported on a horizontal surface as it is opened, a feature of the single lever, two cycle, manual corkscrew machine which differentiates it from most modern corkscrew machines, in particular the Screwpull® machine patented by Herbert Allen and Stephane de Bergen.

Returning to FIG. 5, the inclination angle Φ of the gear rack 13 relative to a vertical plane as discussed above, is determined by the minimum radius $a_{MIN}$ and maximum radius, $a_{MAX}$ of the spiral pinion gear 11 for a rotation angle Θ. Also, as observed previously, the force that is imparted by the pinion gear 13 turned by a lever crank 23 for translating the gear rack 13 is maximized when the pinion gear radius is minimum, and minimized when the pinion gear radius is maximum. These relational parameters provide the skilled mechanical designer with an opportunity to design a machine for example, that provides an initial mechanical advantage for imparting a force $F_F$ for overcoming an initial resistance to relative translation of the pinion gear 11 and the gear rack 13 in one direction, and a final mechanical advantage for imparting a different force $F_F$ for overcoming initial resistance to relative translation of the pinion gear 11 and the gear rack 13 in the opposite direction. In fact the minimum radius $a_{MIN}$ and maximum radius, $a_{MAX}$ of the spiral pinion gear 11 can be related to the such forces $F_I$ and $F_F$ at the respective endpoints of rotation of the spiral pinion gear through angle Θ (and translation of the gear rack 13) by a ratio relationship of the form:

$$a_{MIN}/a_{MAX}=K(F_I/F_f).$$

Accordingly, a skilled mechanical designer can specify the inclination angle Φ of a gear rack 13 and the minimum radius $a_{MIN}$ and maximum radius, $a_{MAX}$ of the spiral pinion gear 11 by anticipating the respective end point forces that must be overcome by the machine for the particular application.

Knowing the inclination angle Φ of a gear rack 13, and using the previously expressed relationships the designer can now specify a desired vertical displacement $D_V$ and determine the effective length $L_{Rack}$ of the inclined gear rack 13 to accomplish that displacement. Knowing the effective length of the gear rack 13, the designer can now optimize the gear tooth profiles of the engaging gears of the spiral radius pinion gear 11 and inclined rack 13 for a given or desired rotation angle Θ. In particular, rotation of the spiral radius pinion gear 11 through a desired rotation angle Θ (always less than 2π radians) has an effective arc length equal to the effective length $L_{Rack}$ of the inclined gear rack 13. Arc length of a spiral s, in polar coordinates, can be related to a desired rotation angle Θ by the relationship:

$$s = \int_{\theta_1}^{\theta_2} \sqrt{r^2 + \left(\frac{dr}{d\theta}\right)^2}\, d\theta$$

where r is the radius from the pole.

From the above relationship the skilled mechanical designer can, by choosing the initial minimum radius $a_{MIN}$ for the spiral pinion gear, tailor the arc length s for the desired rotation angle to equal the effective length $L_{Rack}$ of the inclined gear rack 13.

The embodiments described above comprise both a simple machine or mechanism for translating a driver utilizing an inclined gear rack in combination with a spiral radius pinion gear, and a single lever, two cycle, manual, corkscrew machine which utilizes that novel mechanism. Many modifications and variations of machine can be made both generally, and with respect to the particular corkscrew machine described which, while not described above, will still fall within the spirit and scope of the invention as set forth in the appended claims. While the invention has been described with specific embodiments, those skilled in the art will recognize that changes can be made in form and detail without departing from the spirit and the scope of the invention.

We claim:

1. A machine for continuously varying mechanical advantage of an oscillating crank rotating less than 360° (2π radians) in one direction for linearly reciprocating a driver, comprising in combination, a) a gear rack coupled to the driver inclined at an angle Φ with respect to a desired translation direction of the driver;

b) a rotatable pinion gear having a spiral radius mechanically coupled to a stationary member for rotation about a polar axis engaging the gear rack; and c) means mechanically coupling the crank to the rotatable pinion gear for rotating the pinion gear;

whereby, mechanical advantage of the crank rotating the pinion gear engaging the gear rack increases as engagement between the rack and pinion gears spirally inwardly toward the polar axis and decreases as engagement between the rack and pinion gears spirally outwardly from the polar axis.

2. The machine of claim 1 wherein the angle Φ the gear rack is inclined at ranges between 12" and 18", (π/15 radians and π/10 radians).

3. The machine of claim 1 wherein the radius (r) of the pinion gear is generally expressed by a spiral relationship in polar coordinates as: $r=a_{MIN}+k\Theta$;

where $a_{MIN}$ is an initial radius, Θ is an angle at most equal to 2π radians through which the pinion gear is rotated expressed in radians, and k is a constant factor correlating the length of the spiral to the inclination angle Φ of the gear rack.

4. The machine of claim 1 where the radius (r) of the pinion spirals from an initial radius $a_{MIN}$ to a final radius $a_{MAX}$ upon a rotation of the spiral radius pinion gear through an angle Θ radians at most equal to 2π radians, where the ratio ($a_{MIN}/a_{MAX}$) is determined by a relationship of the form: $a_{MIN}/a_{MAX}=K(F_I/F_f)$;

where $F_I$ is a force that must be applied by the pinion gear as it spirals from its initial radius to its final radius, initiating relative translation of the gear rack in one direction, and $F_f$ is a force that must be applied by the pinion gear as it spirals oppositely from its final radius to its initial radius, initiating relative translation of the gear rack in an opposite direction, and K is a constant factor.

5. The machine of claim 4 wherein the initial radius $a_{MIN}$ is less than the final radius $a_{MAX}$, and wherein the desired initial and final forces are arbitrarily selected based upon an acceptable resistance to rotation of the spiral radius pinion gear encountered by a user rotating the crank coupled to the pinion gear in a first direction, spiraling engagement of the pinion gear and gear rack outwardly from the initial radius $a_{MIN}$, and then in an opposite direction, spiraling engagement of the pinion gear and gear rack inwardly from the final radius $a_{MAX}$.

6. The machine of claim 5 wherein the angle Φ the gear rack is inclined is determined by the relationship:

$$\Phi=\arctan\,[(a_f-a_i)/d],$$

where d is a desired distance of translation of the driver.

7. The machine of claim 6 wherein the desired distance of travel of the driver ranges between 1.5 and 3 inches.

8. The machine of claim 1 wherein the radius (r) of the pinion gear is generally expressed by a logarithmic spiral relationship in polar coordinates as:

$$r=a_{MIN}+ke^{b\Theta}$$

where $a_{MIN}$ is an initial radius, Θ is an angle at most equal to 2π radians through which the pinion gear is rotated expressed in radians, and k and b are constant factors correlating arc length of the spiral radius pinion gear rotating through the angle Θ to a particular length of the inclined gear rack.

9. A machine for accelerating a driver in a direction responsive to rotation of a crank, less than 360° (2π radians) comprising in combination, a) a gear rack coupled to the driver inclined at an angle Φ with respect to the direction of acceleration;

b) a rotatable pinion gear having a spiral radius, mechanically coupled to a stationary member for rotation about a polar axis engaging the gear rack; and c) means mechanically coupling the crank to the rotatable pinion gear for rotating the pinion gear;

whereby, rotation of the pinion gear with the crank accelerates the driver in the desired direction as engagement between the rack and pinion gears spirally outwardly from the polar axis.

10. The machine of claim 9 wherein the angle Φ the gear rack is inclined is 15°, (π/12 radians).

11. The machine of claim 9 wherein the angle Φ the gear rack is inclined at ranges between 12" and 18", (π/15 radians and π/10 radians).

12. The machine of claim 9 where the radius (r) of the pinion spirals from an initial radius $a_{MIN}$ to a final radius $a_{MAX}$ upon a rotation of the spiral radius pinion gear through an angle Θ radians at most equal to 2π radians, where the ratio ($a_{MIN}/a_{MAX}$) is determined by a relationship of the form: $a_{MIN}/a_{MAX}=K(F_I/F_f)$;

where $F_I$ is a force that must be applied by the pinion gear as it spirals from its initial radius to its final radius, initiating relative translation of the gear rack in one direction, and $F_f$ is a force that must be applied by the pinion gear as it spirals oppositely from its final radius to its initial radius, initiating relative translation of the gear rack in an opposite direction, and K is a constant factor.

13. The machine of claim 12 wherein the initial radius $a_{MIN}$ is less than the final radius $a_{MAX}$ and wherein the desired initial and final forces are arbitrarily selected based upon an acceptable resistance to rotation of the spiral radius pinion gear encountered by a user rotating the crank coupled to the pinion gear in a first direction, spiraling engagement of the pinion gear and gear rack outwardly from the initial radius $a_{MIN}$, and then in an opposite direction, spiraling engagement of the pinion gear and gear rack inwardly from the final radius $a_{MAX}$.

14. The machine of claim 13 wherein the angle Φ the gear rack is inclined is determined by the relationship: $\Phi = \arctan[(a_f/a_i)/d]$, where d is a desired distance of translation of the driver.

15. The machine of claim 14 wherein the desired distance of travel of the driver ranges between 1.5 and 3 inches.

16. The machine of claim 9 wherein the radius (r) of the pinion gear is generally expressed by a logarithmic spiral relationship in polar coordinates as:

$$r = a_{MIN} + ke^{b\Theta}$$

where $a_{MIN}$ is an initial radius, Θ is an angle at most equal to 2π radians through which the pinion gear is rotated expressed in radians, and k and b are constant factors correlating arc length of the spiral radius pinion gear rotating through the angle Θ to a particular length of the inclined gear rack.

* * * * *